Patented Mar. 21, 1950

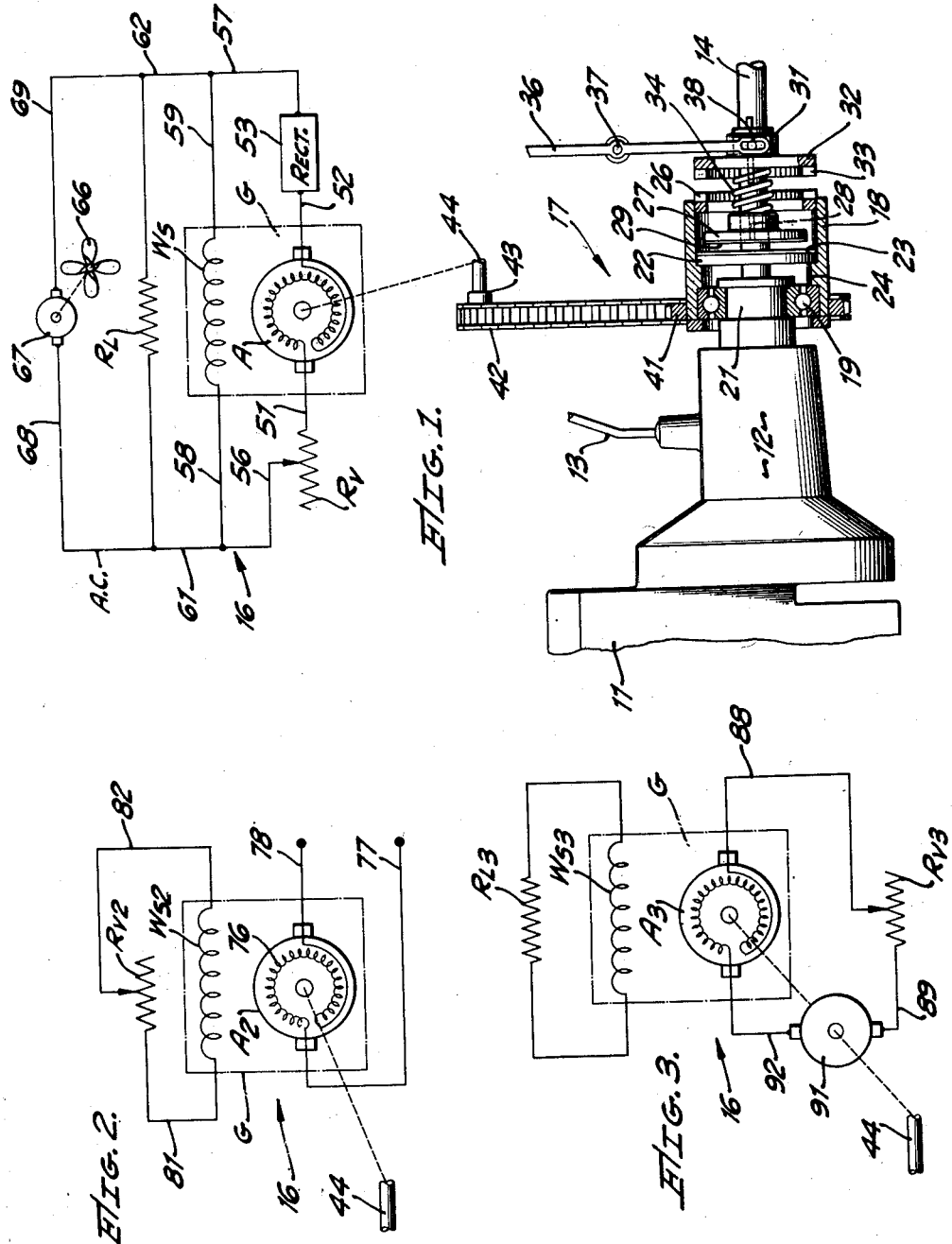

2,501,401

UNITED STATES PATENT OFFICE 2,501,401

ELECTRIC BRAKE

Frank McCurtain, Los Angeles, Calif., assignor to Wendell R. McKenzie, Montebello, Calif.

Application March 28, 1947, Serial No. 737,775

5 Claims. (Cl. 172—284)

The present invention relates to electric brakes in general and particularly to an electric brake for ambulatory vehicles such as automotive trucks, railway cars, etc. More specifically the invention comprises an operator-controlled electrical brake adapted to absorb the braking load of a heavy vehicle over an extended time period, as for example, when descending a long grade, and which is particularly characterized in that the braking unit is clutched gradually into fixed relationship to the load.

The provision of adequate braking power upon heavy high-speed ambulatory vehicles is of tremendous importance. The ability to brake a moving car or truck within reasonable time and distance limits governs, in many instances, maximum speeds. The power required to brake the speed of a moving vehicle within a certain distance and time is exactly equal to the power required to accelerate the vehicle to the same speed within the same limits. It is necessary, however, not only to provide for safe and positive braking of a particular rating but it is also necessary to insure that the braking apparatus will be capable of performing continuously through extended time periods. The long inclines found upon many highways and road beds provide a problem which too frequently ordinary braking means are not capable of handling satisfactorily. The ordinary brakes of large capacity working through friction brake shoes must dissipate the energy absorbed in the form of heat and, although made of proper materials and properly designed, they frequently are incapable of handling the continued loads which they are called upon to assume. In automotive vehicles where non-metallic linings are provided, all too frequently the lining is completely burned out, while in railway cars fires sometimes result.

The provision of an electrical brake is an ideal solution where the power must be dissipated over extended periods of time. The driving energy provided by the moving vehicle is translated into electro-motive force which drives electric current through a suitably cooled resistance and by which the power is absorbed. So long as the heat-dissipating capacity of the resistance is adequate the extension of the time period is unimportant. When the brake in the form of an electrical generating unit is directly connected to a rotating part of the vehicle so that it at all times rotates there is unnecessary wear and deterioration. In the improved electrical brake apparatus constructed in accordance with the present invention the braking means remain idle and inoperative until such time as their application is necessary. They are then brought gradually up to full speed before being connected positively to the rotating part of the machine to be braked.

With an appreciation of the weaknesses and defects of the earlier braking units and of the advantages of a unit which eliminates those disadvantages and defects, it is an object of the present invention to provide a new and improved electrical brake for ambulatory vehicles and for other uses in which a long-continued braking action is required.

It is another object of the invention to provide an electrical braking unit normally de-clutched from the vehicle to be braked and which is gradually brought up to full speed before being loaded.

A further object of the invention is to provide an electric brake for ambulatory vehicles in which the normally inoperative electrical brake is first brought up to speed before being positively connected to the rotating part to be braked, and thereafter the braking action is adjusted by the selective adjustment of a variable resistance element under the control of the operator.

These and other more specific objects will appear upon reading the following specification and claims, and upon considering in connection therewith the attached drawing to which they relate.

Referring now to the drawing in which preferred embodiments of the present invention are illustrated, and in which the same reference character refers to the same parts throughout:

Figure 1 is a view of a preferred embodiment of the invention in which certain parts are shown mechanically and other related parts diagrammatically;

Figure 2 is a diagrammatic view of a modified electrical power-dissipating unit adapted to be substituted for the electrical unit of the first embodiment shown in Figure 1; and Figure 3 is a third embodiment illustrating an electrical current-generating and heat-dissipating unit adapted to be substituted in the Figure 1 construction.

In the drawing the invention is illustrated as embodied in an ambulatory vehicle such as a truck comprising the usual parts of which only those necessary for an understanding of the present invention will be referred to specifically. A transmission 12 is positioned immediately in the rear of the motor proper 11, its gears being selectively controlled by a manually operable shift lever 13. The drive shaft 14 extends rearwardly from the transmission and, in the manner of the usual automotive vehicle, may be connected to the driving wheels. It is to be understood that the drive shaft 14 is to be considered as illustrative in that it may be any rotating part of an ambulatory vehicle directly connected to the rotating carrying wheels and rotatable upon the rotation thereof.

The electrical power-generating and heat-dissipating unit is illustrated diagrammatically in Figure 1, being indicated by the reference character 16, and is connected to and driven by the shaft 14 through a power-transmitting and clutching unit, indicated generally by the reference character 17. The electrical unit 16 is normally inoperative and is conditioned for braking operation only upon being connected to the drive shaft 14 by the clutching unit 17 which will now be described.

A cylindrical casing 18 is rotatably supported by a bearing 19 upon the reduced end 21 of the casing of transmission 12. A flat disc clutch plate 22 carrying a brake lining material 23 upon its rearward face is fixed within casing 18 for rotation therewith, being spaced by an internal shoulder 24 from the outer race of bearing 19. The rearward open end of casing 18 is provided with fixed longitudinally extending gear teeth 26, concentric to shaft 14, the entire construction being fixed longitudinally relative to the shaft.

To bring the cylindrical casing 18 up to the speed of the rotary shaft 14 by cooperation with clutch plate 22 clutch plate 27 is positioned within casing 18 in normal spaced relationship to that plate. Plate 27 is keyed at 28 to shaft 14 for relative longitudinal sliding movement and is provided upon its face adjacent plate 23 with a lining material 29. Rearwardly of casing 18 a longitudinally slidable non-rotatable collar 31 encircles shaft 14, being suitably connected, so as to be able to shift axially in either direction to a circular plate 32, keyed to shaft 14 for sliding movement. Plate 32 is provided on its forward face with circularly arranged teeth adapted in the forward position of collar 31 to mesh with the teeth 26 on casing 18. A strong coil spring 34 spaces plate 32 from movable clutch plate 27, being connected at its ends to the plates. An actuating lever 36 is pivoted to a suitable supporting structure of vehicle 10, its slotted lower end being connected at 38 by a radially extending pin to collar 31. Lever 36 is positioned in the vehicle as to be conveniently controlled by the operator and is adapted to shift collar 31 longitudinally upon shaft 14 and by such movement, and with the cooperation of coil spring 34, to move the clutch plate 27 from its inoperative position, illustrated in Figure 1, forwardly and into engagement with the clutch disc 22 fixed to casing 18.

This relationship of the clutch plate 27 to plate 22 and of the opposed teeth 26 and 33 is such that initial contact is made in the clutching operation by the lined surfaces of the clutch elements 22 and 27. After initial driving contact, and as the operator-actuated lever 36 is further pivoted, the spring 34 is compressed, the continued movement of plate 32 advancing the teeth 33 toward the teeth 26. The compression of spring 34 places a greater force upon the movable clutch plate 27 to force it more firmly against the fixed plate 22 and results in an accelerated clutching action. By the time spring 34 is sufficiently compressed by the forward movement of plate 32 as to bring teeth 33 into mesh with the casing-carried teeth 26 the casing 18 is rotating at the speed of rotation of the shaft 14 and a direct driving relationship is established without clashing.

The rotative force of the cylindrical casing 18, now rotating at the speed of the shaft 14, is transmitted to the electrical braking unit 16 by suitable power-transmission means comprising a gear 41 fixed exteriorly upon casing 18 and transmitting power through a chain 42 to a pinion 43 fixed upon a shaft 44 which rotates with the rotor A of the unit generator G.

Directing attention specifically to electrical unit 16, it is seen to comprise a generator G formed of a rotor A and a stator winding Ws. An operator-controlled variable resistance Rv is connected by a lead 51 to armature A at one of its slip rings while a second lead 52 connects a rectifier 53 to the second slip ring. Leads 56 and 57 extend from the variable resistance Rv and the rectifier 53, respectively, and connect to leads 58 and 59, respectively, leading to stator winding Ws. The current through the armature A is rectified by rectifier 53 and an alternating current is generated upon armature rotation in stator winding Ws. The latter is connected through leads 58 and 59 to leads 61 and 62, respectively connecting to the opposite sides of the load resistance RL. Clearly adjustment of variable resistance Rv varies the current in the rotating field which in turn controls the current generated in the stator winding Ws and so the current which flows through the resistance RL.

As the entire apparatus is mounted upon an ambulatory vehicle the movement of the air relative to the vehicle itself may be relied upon for the removal of heat from resistance RL. Under certain extreme conditions, however, it may be expedient to supplement this readily available heat-removing air stream. In such an event a motor fan unit is provided, comprising an air-moving fan 66 driven by a motor 67 connected by leads 68 and 69 to the leads 61 and 62 connecting to the stator winding Ws. As motor 67 will vary in its speed directly with the frequency of the current generated in stator winding Ws it follows that its speed will vary with the speed of rotation of armature A and so with the load which is placed upon the unit.

The operation of the invention constructed in accordance with the first described embodiment is as follows. In proceeding normally and without need for braking action the clutch unit 17 is open and the clutch plates 22 and 27 are spaced in the manner shown in Figure 1. Cylindrical casing 18 remains standing and the shaft 14 rotates relative thereto. It being desired to brake the vehicle, as during the descent of a long grade, the driver pulls rearwardly upon operating lever 36, whereupon the lower end thereof connected to the clutch collar 31 forces that collar and the attached plate 32 forwardly. The movement of the latter is transmitted through the strong coil spring 34 to the movable clutch plate 27 which is also longitudinally slidable upon driving shaft 14 with which it rotates. Friction lining 29 on movable clutch plate 27 makes contact with the lining 23 upon plate 22 and as the pressure between the plates increases, the collar 31 being moved forwardly by the lever 36, the driven plate 22 is brought up to speed and with it the cylindrical casing 18 to which it is fixed. By the time the collar 31 has been advanced sufficiently to compress the coil spring 34 to a point which enables the gear teeth 33 to mesh with the casing-carried teeth 26, the casing 18 and the shaft 14 are rotating at synchronous speeds.

The rotation of the clutch casing 18 is transmitted, as previously described, through the gear 41, chain 42, and pinion 43 to the shaft 44 which rotates with, or may in fact be the shaft of the generator G. In any event rotation of shaft 44 effects the rotation of armature A which has sufficient residual magnetism to initiate the generation of current. If necessary, however, a flash energization of the armature winding may be provided by any suitable and usual means, such as, for example, the battery of the vehicle. Current generated in the rotor A is controlled by the variable resistance Rv so that the extent of the braking action is under the direct control of the operator. The rotor current is rectified in rectifier 53 but an alternating current is generated in the stator winding Ws. The latter is loaded by the resistance RL, connected thereacross, the current generated being converted into heat and dissipated to the air through which the vehicle moves. As described, additional heat removal ability may be provided by a fan as actuated by the motor 67 connected across the winding Ws.

So long as it is desired to brake the vehicle the unit 16 remains connected and continues to provide a braking power by the generation of current to an extent determined by the position of Rv. Preferably, before opening the clutch unit 17 at the end of the braking period, the operator will return the resistance unit Rv to zero position so that the clutch unit will be transmitting a minimum force. The relationship is one in which the electrical power-absorbing unit can be brought up to speed before being loaded, if desired, and in all events is at full driving speed before being positively and directly connected by the intermeshing gears.

Referring now to Figure 2 in particular, a second preferred modification of the invention is illustrated in part and is in all respects, except those hereinafter specified, identical to the first described embodiment. The distinctions present reside in the current-generating, load-absorbing unit illustrated, which is again generally indicated by the reference character 16. As in the first embodiment the shaft 44 is clutched to the drive shaft 14 of the vehicle to be braked and itself serves to drive the generator rotor. The latter is indicated by the reference character A2 and comprises a plurality of poles formed by permanent magnets of high intensity and strength. Windings, indicated by the reference character 76, are wound upon the poles, being connected to the rotor slip rings and through them to external leads 77 and 78 for the purpose of enabling the permanent magnets to be remagnetized at intervals and as required. No other electrical connections are made to the armature. The stator winding is indicated by the reference character Ws2 and is connected by leads 81 and 82 to the variable resistance Rv2. In all other respects this embodiment of the invention is identical to that first described.

The operation of this second preferred embodiment of the invention is identical to the first embodiment except as to the electrical operating characteristics. Here the rectifier of the first embodiment has been eliminated and the permanent magnets of the rotor A2 are relied upon to provide the magnetic field necessary to generate current in the stator winding Ws2. The current generated in that winding is conducted through leads 81 and 82 to the variable resistance Rv2 which is adjustable under the control of the operator. If desired the additional cooling means, as described in the first embodiment, may also be included.

Referring now to Figure 3, a third preferred embodiment of the invention is partially illustrated, which, in the manner of the disclosure of Figure 2, is adapted to be substituted for the electrical unit 16 in the embodiment of Figure 1. Again the electrical current-generating and power-absorbing unit is indicated generally by the reference character 16, and the rotor A3 is connected to and driven by the shaft 44, connected as previously described. The stator winding, here indicated by Ws3, has current generated in it by the rotation of the rotor A3, the current passing through conductors 86 and 87 to the resistance RL3 to be dissipated in the form of heat as in the preceding embodiments. In the present instance, however, the braking load, as indicated by the stator current, is controlled by a variable resistance Rv3 connected in series by leads 88 and 89 to the rotor A3 and to an exciter generator 91. The latter is also connected to the rotor A3 through a third lead 92. Exciter generator 91 is also driven by shaft 44 from the drive shaft 14 and generates a direct current proportional in magnitude to its speed of rotation, subject to the control of the manually operable variable resistance Rv3. This particular construction has the advantage in load adjustment in that the exciting current to be varied is of much smaller magnitude than the load current.

The operation of this third preferred embodiment of the invention is similar to that previously described. The clutching operation is identical to that of the first embodiment and the current generated in the stator winding Ws3 is proportional to the speed of rotation of the rotor A3, determined by the speed of rotation of the shaft 44 and so of shaft 14, and is also proportional to the excitation current provided by the exciter 91 under the control of the operator-controlled resistance Rv3. As in the previous embodiment the load current in the winding Ws3 is absorbed in the resistance RL3 and dissipated in the form of heat to the surrounding air. As in the first and second embodiments a motor-driven fan, as illustrated in the first embodiment, may be included for the resistance if preferred.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In combination in an ambulatory vehicle of the type including a driving motor and a drive shaft connected thereto, brake means to brake said vehicle comprising an electric generator, means to load said generator to vary the braking effect, a casing enclosing said shaft and mounted for independent rotation relative thereto, power-transmitting means connecting said casing to said generator, and means to bring said casing up to synchronous speed with said shaft comprising a friction clutch member fixed to said casing and rotatable therewith, a second friction clutch member fixed to said shaft for rotation therewith and longitudinally slidable thereon, manually operable means to adjust said second clutch member into and from frictional engagement with said friction clutch member, and cooperating positively engaging means on said shaft and on said casing engageable after said friction members are in full engagement to lock said shaft and said casing together.

2. The construction recited by the preceding claim characterized in that said means to load said generator are adjustable independently of said clutch whereby said generator may be loaded after being clutched to said shaft to reduce the load upon the clutch.

3. In combination in an ambulatory vehicle of the type including a driving motor and a drive shaft connected thereto, means to brake said vehicle including an electric generator having a wound rotor, a wound field connected to said rotor, and a rectifier and a variable resistance in series with said rotor winding to provide a direct current for said field and to vary the load, respectively, a casing enclosing said shaft and mounted for independent rotation relative thereto, power-transmitting means connecting said casing to said generator, and means to bring said casing up to synchronous speed with said shaft comprising a friction clutch member fixed to said casing and rotatable therewith, a second friction clutch member fixed to said shaft for rotation therewith and longitudinally slidable thereon, manually operable means to adjust said second clutch member into and from frictional engagement with said friction clutch member, and cooperating positively engaging means on said shaft and on said casing engageable after said friction members are in full engagement to lock said shaft and said casing together.

4. In combination in an ambulatory vehicle of the type including a driving motor and a drive shaft connected thereto, means to brake said vehicle including an electric generator having a permanent magnet rotating field with a remagnetizing winding, and a stator winding loaded by a variable resistance to vary the braking effect, a casing enclosing said shaft and mounted for independent rotation relative thereto, power-transmitting means connecting said casing to said generator, and means to bring said casing up to synchronous speed with said shaft comprising a friction clutch member fixed to said casing and rotatable therewith, a second friction clutch member fixed to said shaft for rotation therewith and longitudinally slidable thereon, manually operable means to adjust said second clutch member into and from frictional engagement with said friction clutch member, and cooperating positively engaging means on said shaft and on said casing engageable after said friction members are in full engagement to lock said shaft and said casing together.

5. In combination in an ambulatory vehicle of the type including a driving motor and a drive shaft connected thereto, means to brake said vehicle including an electric generator having a wound rotor energized by an exciter driven by the rotor shaft, and a wound stator loaded by a variable resistance to vary the braking load, a casing enclosing said shaft and mounted for independent rotation relative thereto, power-transmitting means connecting said casing to said generator, and means to bring said casing up to synchronous speed with said shaft comprising a friction clutch member fixed to said casing and rotatable therewith, a second friction clutch member fixed to said shaft for rotation therewith and longitudinally slidable thereon, manually operable means to adjust said second clutch member into and from frictional engagement with said friction clutch member, and cooperating positively engaging means on said shaft and on said casing engageable after said friction members are in full engagement to lock said shaft and said casing together.

FRANK McCURTAIN.

REFERENCES CITED

The following references are of record in the file of this patent:

UNITED STATES PATENTS

| Number | Name | Date |
| --- | --- | --- |
| 258,968 | Wilkinson | June 6, 1882 |
| 1,423,631 | Scaife | July 25, 1922 |
| 1,510,892 | Kobayashi | Oct. 7, 1924 |
| 1,677,633 | Harrison | July 17, 1928 |
| 2,052,788 | Miller | Sept. 1, 1935 |
| 2,317,254 | Cowin | Apr. 20, 1943 |